United States Patent Office 3,753,984
Patented Aug. 21, 1973

3,753,984
AMIDES DERIVED FROM THE ESTERS OF 1-PIPER-
AZINE PROPIONIC ACID, THEIR METHOD OF
PREPARATION AND THEIR APPLICATION TO
THERAPEUTICS
Claude P. Fauran, Michel J. Turin, and Guy M. Raynaud, Paris, and Bernard M. Pourrias, Meudon La Foret, France, assignors to Delalande S.A.
No Drawing. Filed May 26, 1971, Ser. No. 147,274
Int. Cl. C07d 51/70
U.S. Cl. 260—240 J                               2 Claims

ABSTRACT OF THE DISCLOSURE

Compounds of the formula

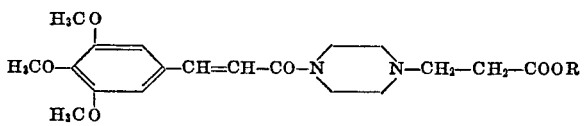

in which R is alkyl having 1 to 4 carbon atoms.

The compounds are made by reacting 3,4,5-trimethoxy cinnamoyl halide with an ester of 1-piperazine propionic acid in the presence of an alkaline agent.

The compounds possess properties of coronary dilation with a diminution of the cardiac consumption of oxygen as well as hypotensive, vasodilator and β-inhibitor properties.

kaline agent capable of combining with the hydracid formed during the reaction.

The following preparation is given as a non-limiting example to explain the invention.

1-(3',4',5'-trimethoxycinnamoyl) 4-(ethoxy carbonyl ethyl) piperazine maleate (code number 6924)

51 g. of trimethoxy cinnamoyl chloride and 25 g. of sodium bicarbonate are dissolved in 300 ml. of ethyl acetate. The temperature of the mixture is raised to 65° C., and then 37 g. of 1-piperazine propionic acid ethyl ester are introduced under stirring. The back flow is then maintained for an hour. After cooling, 200 ml. of water are added. The organic phase is decanted and then it is concentrated. The residue obtained is crystallised in a mixture of ethyl acetate and isopropyl ether.

The product obtained is dissolved in absolute ethanol and processed by the equivalent proportion of maleic acid. The maleate obtained is centrifuged and crystallised in ethanol.

Melting point: 146° C.
Yield: 50%
Empirical formua: $C_{25}H_{34}N_2O_{10}$

Elementary analysis.—Calculated (percent): C, 57.46; H, 6.56; H, 5.36. Obtained (percent): C, 57.55; H, 6.36; N, 5.22.

The compounds recorded in the following Table I were prepared according to the invention.

TABLE I

| Code number | R | Form | Empirical formula | Recrystallisation solvent | Yield (percent) | Melting point (° C.) | Calculated C | Calculated H | Calculated N | Obtained C | Obtained H | Obtained N |
|---|---|---|---|---|---|---|---|---|---|---|---|---|
| 69339 | $CH_3-(CH_2)_3-$ | Base Maleate | $C_{27}H_{38}N_2O_{10}$ | Isopropyl alcohol Ethanol | 45 | 165 | 59.80 | 6.96 | 5.09 | 58.85 | 7.20 | 5.23 |
| 7025 | $CH_3-$ | Base Maleate | $C_{24}H_{32}N_2O_{10}$ | Ethyl acetate isopropyl ether Ethanol | 51 | 160 | 56.68 | 6.34 | 5.51 | 56.84 | 6.56 | 5.49 |
| 70102 | $CH_3-(CH_2)_2-$ | Maleate | $C_{26}H_{36}N_2O_{10}$ | | 62 | 144 | 58.20 | 6.76 | 5.22 | 58.01 | 6.73 | 5.08 |
| 70153 | $CH_3$<br>$\quad\diagdown$<br>$\quad\quad CH-$<br>$\quad\diagup$<br>$CH_3$ | Maleate | $C_{26}H_{36}N_2O_{10}$ | | 60 | 151 | 58.20 | 6.76 | 5.22 | 58.01 | 6.85 | 5.36 |

The present invention has for its object new amides derived from the esters of 1-piperazine propionic acid, their method of preparation and their application to therapeutics.

The new compounds according to the invention correspond to the general formula:

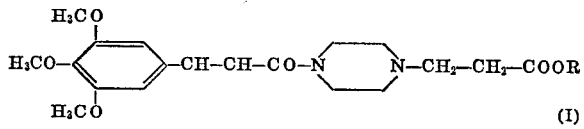

in which R represents an alkyl chain having from 1 to 4 carbon atoms.

The method of the invention consists in causing a 3,4,5-trimethoxy cinnamoyl halide whose formula is:

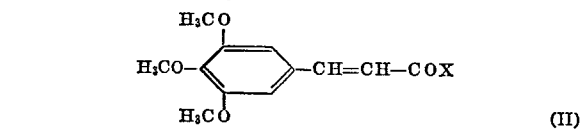

in which X represents a halogen atom, to react with an ester of 1-piperazine propionic acid, whose formula is:

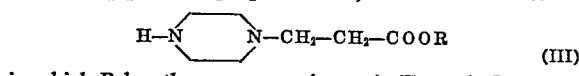

in which R has the same meaning as in Formula I operating in an organic solvent and in the presence of an al- The compounds of Formua I were tested on the laboratory animal and showed, in particular, properties of coronaryl dilatation with a diminution of the cardiac consumption of oxygen, as well as hypotensive, vasodilatator and β-inhibitor properties.

1°. Properties of coronarydilatation and action on the consumption of oxygen

The compounds of Formula I are capable, by intravenous perfusion or by intraduodenal administration, of increasing the flow of the coronary sinus venosus in an anaesthetised dog. Moreover, they increase the $pO_2$ of the blood of the coronary sinus venosus and reduce the myocardial extraction of oxygen.

As examples, the results obtained with a certain number of compounds of Formula I are recorded in the following Table II:

TABLE II

| Code number | Dose administered to the dog (mg./kg./IV) | Increase in the flow of sinus venosus (percent) | Increase of the $pO_2$ of the blood of the sinus venosus (percent) |
|---|---|---|---|
| 6924 | 25 | 85 | 90 |
| 69339 | 15 | 25 | 50 |
| 7025 | 25 | 50 | 100 |
| 70102 | 20 | 70 | 100 |

2°. Hypotensive properties

The compounds of Formula I injected intravenously cause a drop of the arterial pressure in an anaesthetised cat.

As examples, the results obtained with a certain number of compounds of Formula I are recorded in Table III below:

TABLE III

| Code number | Dose administered to the cat (mg./kg./IV) | Diminution of the arterial pressure (percent) |
|---|---|---|
| 6924 | 6.5 | 50 |
| 69339 | 12.5 | 50 |
| 7025 | 25 | 50 |
| 70102 | 12.5 | 40 |

3°. Vasodilatatory action

Administered intra-arterially, the compounds of Formula I greatly increase the flow in the artery where the injection was carried out. This action has been studied in an anaesthetised dog whose femoral artery flow was measured by a rotameter placed on a tapping coming from the homolateral carotid artery and supplying the femoral artery.

As examples, the results obtained with a certain number of compounds of Formula I are recorded in the following table IV:

TABLE IV

| Code number | Dose administered to the dog (mg./kg./IA) | Percentage of effectiveness |
|---|---|---|
| 6924 | 0.100 | 100 |
| 69339 | 0.250 | 70 |
| 7025 | 0.125 | 50 |
| 70102 | 0.125 | 50 |

4°. β-Inhibitory action

On the isolated auricle of a guinea-pig, the compounds of Formula I are capable of opposing the increase in frequency produced by isoprenaline.

As an example, compound number 6924 gave, with a concentration of 0.02 mg./ml., an effectiveness percentage of 60%.

As is clear from the above results and from those recorded in Table V below, the difference between pharmacologically active doses and lethal doses is sufficiently great to allow the compounds of Formula I to be used in therapeutics.

TABLE V

| Code number | DL 50 in the mouse (mg./kg./IV) |
|---|---|
| 6924 | 265 |
| 69339 | 180 |
| 7025 | 590 |
| 70102 | 230 |

The compounds of Formula I are recommended for the treatment of coronaropathy, hypertension and troubles of cerebral and peripheral irrigation.

They will be administered in the form of tablets, pills, capsules and delayed action tablets, dosed with 50 to 500 mg. of the active constituent, from 1 to 5 to be taken every 24 hours, and in the form of phials for injection, dosed with 10 to 100 mg. of the active constituent, at the rate of 1 to 3 a day.

What is claimed is:
1. A compound of the formula:

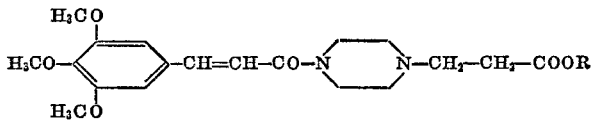

in which R is alkyl having 1 to 4 carbon atoms, and the pharmaceutically acceptable salts thereof.

2. A compound according to claim 1 in which R is selected from the group consisting of methyl, ethyl, propyl, isopropyl and butyl.

References Cited

UNITED STATES PATENTS

| | | | |
|---|---|---|---|
| 3,331,842 | 7/1967 | Delalande | 260—240 J |
| 3,590,034 | 6/1971 | Fauran et al. | 260—240 J |

OTHER REFERENCES

Fauran et al., Chim. Ther. 1969, pp. 290–2.
Huguet et al., Chim. Ther. 1969, p. 293.

JOHN D. RANDOLPH, Primary Examiner

U.S. Cl. X.R.

424—250; 260—268 R, 544 N

UNITED STATES PATENT OFFICE
CERTIFICATE OF CORRECTION

Patent No. 3,753,984  Dated August 21, 1973

Inventor(s) Claude P. Fauran, Michel J. Turin, Guy M. Raynaud and Bernard M. Pourrias It is certified that error appears in the above-identified patent and that said Letters Patent are hereby corrected as shown below:

Foreign Application Priority Data

June 3, 1970   France ----------70.20278

Signed and sealed this 12th day of February 1974.

(SEAL)
Attest:

EDWARD M. FLETCHER, JR.
Attesting Officer

C. MARSHALL DANN
Commissioner of Patents